United States Patent Office 3,719,462
Patented Mar. 6, 1973

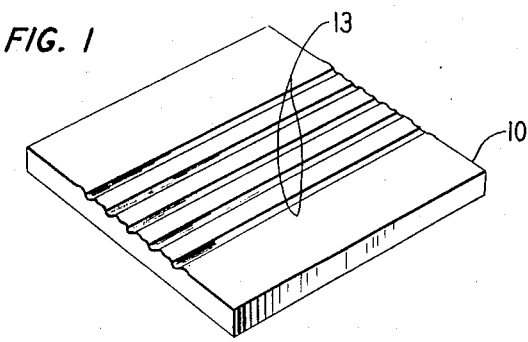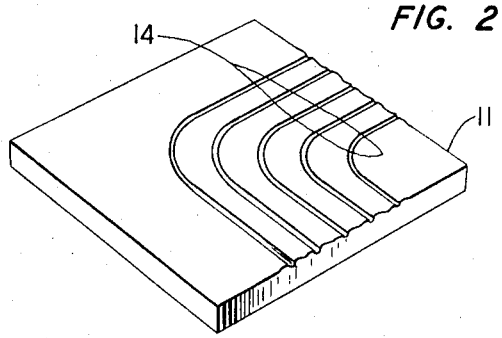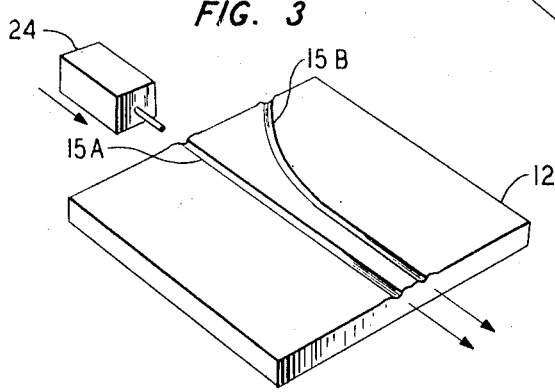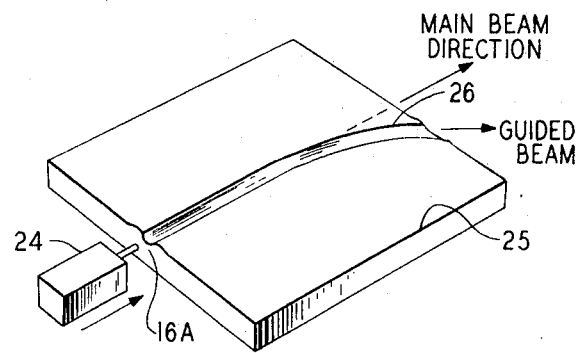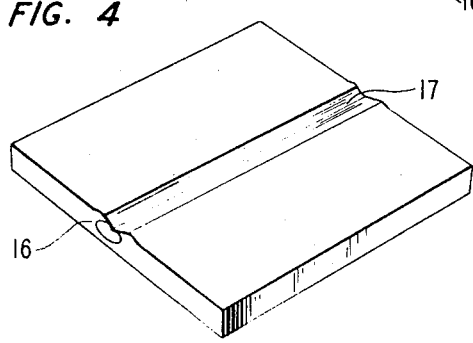

3,719,462
LIGHT GUIDE PATHS COMPRISING DENSIFIED REGIONS IN A TRANSPARENT MEDIUM; AND METHOD OF PRODUCING
Peter Andreatch, Jr., New Shrewsbury, and George Myles Cordell Fisher, Holmdel, N.J., assignors to Bell Telephone Laboratories, Incorporated, Murray Hill, N.J.
Filed Dec. 21, 1970, Ser. No. 99,819
Int. Cl. C03c 15/00; C03b 21/00, 5/14
U.S. Cl. 65—30    4 Claims

ABSTRACT OF THE DISCLOSURE

This disclosure describes a method for constructing small-scale light guide elements by achieving the needed refractive index change through a process of selective densification in the optical medium. The material immediately beneath the surface of the medium is strained a controlled amount along a desired path, producing a corresponding permanently densified zone thereunder. One stressing method involves surface scribing as by a diamond indenter. A second stressing method employs a ribbed die. Elemental paths thus constructed are described.

FIELD OF THE INVENTION

This invention relates to light guide elements and specifically to light guides of small scale and methods for producing same.

BACKGROUND OF THE INVENTION

With communications by laser a prospect of the not-too-distant future, increasing thought has been given to the design of optical circuit elements for laser beam guidance. A summary of several suggested techniques for achieving optical guide paths for this purpose is contained in the article by S. E. Miller, "Integrated Optics: An Introduction," Bell System Technical Journal, vol. 48, No. 7, page 2059 et seq., September 1969. This article to the extent relevant is hereby incorporated by reference into this application.

The methods so far proposed for obtaining the requisite changes in the refractive index along a zone constituting the guide path in such elements, include ion bombardment or implantation, cladding, ultraviolet light irradiation, and chemical etching. In all cases, the guide paths are intended to be as small as possible, for example, less than a mil in width and often of the order of the light wavelength in the medium.

Preferably, the paths are formed by defined regions of prescribed refractive index gradient and are made in a single operation. In respect to controlled gradient and single operation manufacture, the above-noted methods do not yield fully satisfactory results.

Accordingly, one object of the invention is to realize light guide paths in an optical element in a simple fashion and at low cost.

A further inventive object is to perfect a method of realizing light guide paths that does not require expensive equipment or complex steps.

A specific object of the invention is to form in a single operation defined light guiding channels of desired refractive index in an optically transmissive element of small scale.

SUMMARY OF THE INVENTION

Pursuant to the invention, regions of refractive index increase are achieved in an optically transparent substrate material along any desired path underlying a surface, by a controlled physical compacting or stressing of the underlying material. The refractive index changes occur from the permanent densification of the substrate material that results from the inelastic straining.

In one embodiment, densification within the material is achieved by physically scribing paths upon the sugstrate surface. By a suitable choice of indenter pressure, and substrate medium, permanent grooves of the order of a few microns in width and a fraction of a micron in depth are readily produced without fracture or relaxation effects. The regions beneath the scribe path has been observed to conduct or transmit useful quantities of light. Substrate materials considered in accordance with the foregoing teaching include glass, fused silica, Lucite (poly[methyl methacrylate]), and gallium phosphide.

In an alternate embodiment of the inventive method, surface stressing is achieved with a ribbed die patterned in accordance with a desired configuration of densified paths to be achieved.

In a further embodiment of the resulting structures, the indented regions so produced are filled with a material selected for its refractive index as a solid. Its index complements the refractive index change achieved in the region beneath the scribed path.

The invention and its further objects, features and advantages will be more fully appreciated from a reading of the description to follow of illustrative embodiments.

BRIEF DESCRIPTION OF THE DRAWING

FIGS. 1, 2, 3 and 4 are schematic perspective diagrams of guide path patterns formed in a glassy material pursuant to the invention;

FIG. 7 is a schematic perspective diagram of a guide path in combination with a light source;

DETAILED DESCRIPTION OF THE ILLUSTRATIVE EMBODIMENTS

Glass is one preferred material for the guide path containing substrate, because of its good optical transmission properties, high mechanical strength and tendency to maintain permanently densified regions in highly compressed areas. Types of glass deemed preferred include most silicate glasses and especially fused silica because of its relatively open structure.

FIGS. 1, 2 and 3 depict three glass slabs for substrates 10, 11, 12 which have been stressed in different predetermined patterns by the methods of the invention. Each of the substrates 10–12 has been stressed along its top surface in the regions 13, 14, 15 respectively. The resulting densified regions lie directly below the zones of stress. The region 16, of FIG. 4 schematically represents a densified region beneath a stressed area 17, the size of which is greatly exaggerated for illustrative purposes.

Figure 5:
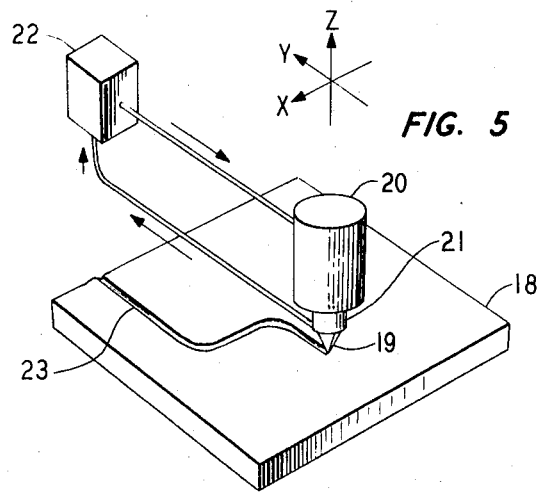
FIG. 5 is a schematic perspective diagram of apparatus for forming the paths.
Figure 6:
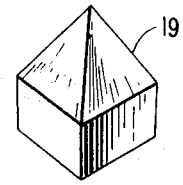
FIG. 6 is a front perspective diagram of the scribing head of FIG. 5.

FIG. 5 demonstrates one method of physically stressing the glass surface to achieve the underlying densification. A substrate 18 of glass is contacted by a diamond indenter 19 depicted in FIG. 6 and held by a head 20 movable in X, Y, and Z directions as illustrated. A stress-sensing device 21 monitors the force applied by indenter 19 to the surface of substrate 18, and transmits readings thereof to a control unit 22. The latter is set to maintain the force of indenter 19 within a preselected range. When the monitor 21 indicates the range is exceeded, control unit 22 causes the head 20 to be adjusted in the Z direction to restore the force to within the desired range. In this fashion, the stress mark 23 produced by force of the indenter 19 is controlled.

Experience has indicated that the control is necessary for the purposes of the present invention, particularly where glass is the substrate material, as the following example will illustrate.

EXAMPLE 1

A number of glass substrates were scribed in the manner described with respect to FIG. 5 above, using a Vickers hardness tester as the tool. The substrates were plate glass microscope slides commercially available as number 12-550 from Fisher Scientific Co. of New Jersey. Different Loads were placed upon the indenter diamond depicted in FIG. 6. Thereafter, the substrates were tested. A 15-gram load produced an indentation which measured 3- to 5-microns in width and 1- to 2-microns in depth. The 15-gram load achieved a crack-free indentation. A 25-gram load produced a desirable indentation 3- to 6-microns in width. No cracking was observed. A 50-gram load produced very small cracks along the indentation edge. Loads of 100-300 grams produced an oversized indentation with large cracking observed.

The optimum stressing is that which causes the glass to have permanent residual densified zones under the applied stress, without any cracking or shattering. The latter constitutes a stress-relieving phenomenon which also relieves the densification and hence renders the refractive index change nonuniform. Thus, cracking is undesirable.

Substrates of glass constructed in accordance with the above teachings and in patterns such as depicted in FIGS. 1-3, were tested for light transmissivity. As seen in FIG. 7, a source 24 of laser light was directed axially into the densified region 16a of a glass substrate 25 that had been stressed along the curved zone 26. The main beam path was straight, but also light was observed at the far end of the curved densified region. The same result was typically observed in all such tests. The light intensity at the far end of a densified region 1-inch long, for example, is sufficient to easily distinguish it from the absence of light, thus demonstrating at least the binary capability of such a device.

Using the above test procedures, the coupling circuit 15 depicted in FIG. 3 was tested by placing laser light 24 axially into one end of the straight path 15a. Light was observed to be emitting from the far end of the curve path 15b.

Using the techniques described, it has been possible to obtain separations between adjacent densified regions of less than 0.001 inch. Such proximity of paths is desirable for coupling light from one path into another as in FIG. 3.

Figure 8:
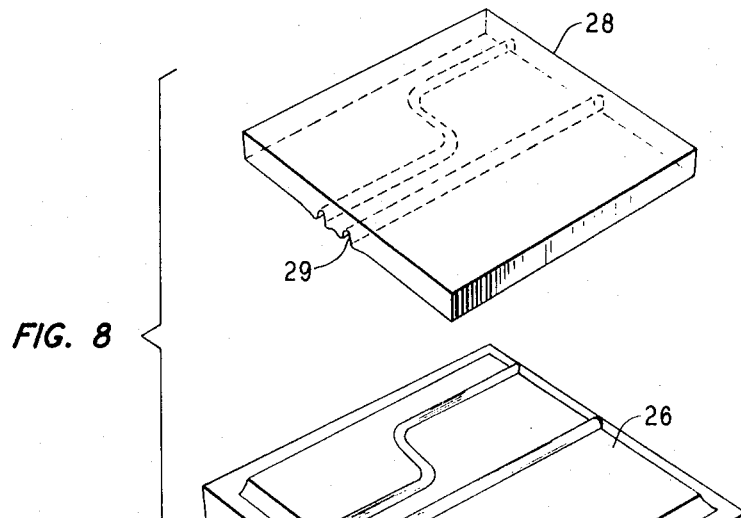
FIG. 8 is a schematic perspective diagram of an alternate forming apparatus.

An alternate method for producing a stressed region in a glass substrate is depicted in FIG. 8. A substrate 26 is mounted on a solid surface 27 with the surface to be stressed being freely accessible. A metallic die 28 constructed with a preselected pattern with protruding ribs 29 is mounted upon a vertically moving press, not shown. The die with the ribs 29 is brought into uniform contact with the surface of substrate 26 to be stressed. A predetermined force by the press produces a desired degree of permanent deformation at a given temperature. The advantage of this mode of stressing to realize the desired densification is that an entire surface may be stressed with a preselected pattern at once.

EXAMPLE 2

A Lucite (poly-methyl-methacrylate sheet) approximately 3 by 1 by ¼ inches was stressed with a series of grooves using loads of 25, 50, 100, 200, 300 grams and the apparatus of FIG. 5. An inspection of the grooves revealed all grooves to be free of any chips, cracks, and breaks. Light transmission tests in all grooves indicated that the regions densified transmitted useful amounts of light.

EXAMPLE 3

A substrate of gallium phosphide ⅛ inch in thickness and 1 inch in diameter was indented as in Example 2, using indenter loads of 15-300 grams. It was observed that perfect grooves were obtained with loads of up to 25 grams, but that chipping at the edges materialized at intermediate loads; and at loads of 300 grams severe breaking occurred. Tests on the densified region beneath zones produced by the 15- and 25-gram loads revealed the formation of paths.

EXAMPLE 4

Using the methods of Example 2, a fused silica plate approximately 5 centimeters in diameter and 0.3 centimeter thick was indented with a series of loads varying from 15 to 300 grams. The grooves made with 15, 25, and 50-gram loads revealed no chipping along the edges; but the grooves made with the larger loads revealed substantial cracking along the edges of the groove. Again, transmissivity tests on the 15, 25, and 50-gram-produced grooves revealed useful levels.

Investigation of each substrate material for possible deleterious relaxation effects was negative, indicating that the densified zones were in fact permanent.

Figure 9:
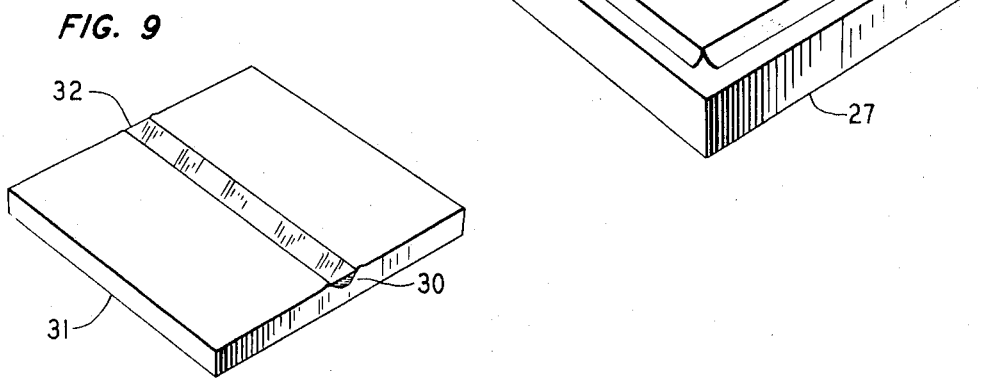
FIG. 9 is a perspective view of an alternate guide path.

FIG. 9 illustrates a refinement of the present invention, involving placing of a transparent flowable material into an indentation made pursuant to the prime inventive teaching. The indentation 30 of substrate 31 is shown filled with a transparent fluid 32 of higher refractive index than the substrate. This class of material is characterized by the properties of appropriately high refractive index, proper wetting characteristics relative to the substrate and good optical transmission. By appropriate choice of fluid properties, the filled channel can be used to either serve as a light guide by itself or to complement the underlying densified zone in its light guiding function. In the latter case, it may be desirable for the fluid to substantially wet the substrate surface which it contacts. It further may be advantageous to select a solidifying fluid for optical reasons as well as to avoid having to contain the fluid.

In summary, the inventive method of achieving refractive index change by densification yields desired refractive index gradients through close and continuous control of the mechanical densification. As a consequence, tolerances as to surface flatness can be appreciably relaxed since the extent of indentation depends only upon the force applied, which is monitored.

It is to be understood that the embodiments described herein are merely illustrative of the principles of the invention. Various modifications may be made thereto by persons skilled in the art without departing from the spirit and scope of the invention.

What is claimed is:

1. A process for producing light-guiding paths in an optical medium, comprising the steps of:
   mechanically stresing defined narrow zones along a surface of said element in amounts sufficient to permanently densify the bulk material therebeneath through permanent inelastic deformation, said densification resulting in a refractive index change in said bulk beneath said regions sufficient to guide light along the path beneath said zone.

2. A process pursuant to claim 1, wherein said mechanical stressing occurs in a zone cross sectionally approximately 3 to 5 microns wide and a fraction of a micron deep.

3. A method pursuant to claim 2, wherein said element is fused silica.

4. A method for producing light-guiding paths selectively beneath a flat surface of a solid-rigid light-transmissive substrate capable of undergoing permanent inelastic deformation, each path having an input end and an output end respectively occurring in surfaces substantially normal to said flat surface comprising the steps of:
   contacting said surface with a stressing element having a point that is in cross section approximately 3 to 5 microns wide;

drawing said element across said surface with an applied force sufficient to effect in said surface a groove having a depth of a fraction of a micron;

monitoring the actual force applied;

adjusting said force in accordance with the monitoring data to fall within a preselected range thereby to limit and control said depth, said range determined by the ability of said material to densify beneath said groove through permanent inelastic deformation without cracking.

References Cited

UNITED STATES PATENTS

| | | | |
|---|---|---|---|
| 3,022,541 | 2/1962 | Passley et al. | 264—293 X |
| 2,694,226 | 11/1954 | Luboshez | 264—293 X |
| 3,450,585 | 6/1969 | Takagi et al. | 264—293 X |
| 3,636,147 | 1/1972 | Rowland | 264—284 X |
| 3,594,457 | 7/1971 | Wright | 264—293 X |

OTHER REFERENCES

Research Into Glass, vol. II, p. 6; Industries pp. 46–48, Role of Densification in Deformation of Glasses Under Point Loading.

College Technical Physics by Weber, p. 708, 1947, McGraw-Hill Book Co.

FRANK W. MIGA, Primary Examiner

U.S. Cl. X.R.

65—37, 102, 112, 174; 350—96 WG, 175 GN